US012233478B2

(12) United States Patent
Demos

(10) Patent No.: US 12,233,478 B2
(45) Date of Patent: Feb. 25, 2025

(54) LASER-ASSISTED ADDITIVE MANUFACTURING

(71) Applicant: LAWRENCE LIVERMORE NATIONAL SECURITY, LLC, Livermore, CA (US)

(72) Inventor: Stavros G. Demos, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 797 days.

(21) Appl. No.: 16/589,362

(22) Filed: Oct. 1, 2019

(65) Prior Publication Data

US 2020/0030916 A1 Jan. 30, 2020

Related U.S. Application Data

(62) Division of application No. 14/969,190, filed on Dec. 15, 2015, now Pat. No. 10,471,543.

(51) Int. Cl.
*B23K 26/342* (2014.01)
*B23K 26/06* (2014.01)

(52) U.S. Cl.
CPC ........ *B23K 26/342* (2015.10); *B23K 26/0604* (2013.01)

(58) Field of Classification Search
None
See application file for complete search history.

(56) References Cited

U.S. PATENT DOCUMENTS

| 4,627,896 | A | 12/1986 | Nazmy et al. | |
|---|---|---|---|---|
| 4,858,172 | A | 8/1989 | Stern | |
| 5,387,777 | A | 2/1995 | Bennett et al. | |
| 5,666,325 | A | 9/1997 | Belser et al. | |
| 6,504,127 | B1 * | 1/2003 | McGregor et al. | .... B23K 26/00 219/121.63 |
| 6,680,456 | B2 | 1/2004 | Adams | |
| 7,020,539 | B1 | 3/2006 | Kovacevic | |
| 8,892,249 | B2 | 11/2014 | Holman et al. | |
| 9,597,749 | B2 | 3/2017 | Bruck | |
| 2001/0004480 | A1 | 6/2001 | Mueller et al. | |
| 2003/0116542 | A1 * | 6/2003 | McGregor et al. | .... B23K 26/34 219/121.64 |

(Continued)

FOREIGN PATENT DOCUMENTS

| DE | 10351176 A1 * | 6/2005 | ......... E01C 19/1022 |
|---|---|---|---|
| EP | 2543465 A2 * | 1/2013 | ............. B23K 26/34 |

(Continued)

OTHER PUBLICATIONS

Machine translation of WO 2013178825 A2 performed on Apr. 14, 2022, Pialot et al. (Year: 2013).*

(Continued)

*Primary Examiner* — Dana Ross
*Assistant Examiner* — Kevin Guanhua Wen
(74) *Attorney, Agent, or Firm* — James S. Tak

(57) ABSTRACT

Laser additive manufacturing apparatus, systems, and methods for the fabrication of high quality freeform high value structures. The apparatus, systems, and methods utilize a material powder having varying particle size and shape as raw material. It can also be adopted to use a wire as the feed material.

3 Claims, 12 Drawing Sheets

(56) References Cited

U.S. PATENT DOCUMENTS

| | | |
|---|---|---|
| 2003/0206820 A1 | 11/2003 | Keicher et al. |
| 2009/0218328 A1 | 9/2009 | Johnson et al. |
| 2010/0291401 A1 | 11/2010 | Medina et al. |
| 2013/0105447 A1 | 5/2013 | Haake |
| 2013/0136868 A1 | 5/2013 | Bruck et al. |
| 2014/0263195 A1* | 9/2014 | Shuck .................. B23K 26/34 219/76.14 |
| 2015/0024233 A1 | 1/2015 | Gunther |
| 2015/0064047 A1 | 3/2015 | Hyde et al. |
| 2015/0165556 A1 | 6/2015 | Jones et al. |
| 2015/0273631 A1 | 10/2015 | Kenney et al. |
| 2016/0114432 A1 | 4/2016 | Ferrar et al. |
| 2016/0193696 A1 | 7/2016 | McFarland et al. |
| 2016/0279707 A1 | 9/2016 | Mattes et al. |
| 2016/0332371 A1 | 11/2016 | Staroselsky et al. |
| 2017/0113303 A1 | 4/2017 | Rockstroh et al. |
| 2017/0182556 A1 | 6/2017 | Ramaswamy et al. |
| 2017/0232519 A1 | 8/2017 | Pan et al. |

FOREIGN PATENT DOCUMENTS

| | | | | |
|---|---|---|---|---|
| ES | 2390533 T3 | * | 11/2012 | ............. B23K 26/32 |
| GB | 2489493 A | * | 10/2012 | ............. B23K 9/167 |
| JP | 3370203 B2 | * | 1/2003 | ............. B54G 5/40 |
| KR | 20140048246 A | * | 4/2014 | ............. B22D 35/02 |
| KR | 20140048246 A1 | * | 4/2014 | ............. B22D 35/02 |
| WO | WO 2012119947 A1 | * | 9/2012 | ............. B23D 61/18 |
| WO | WO 2013178825 A2 | * | 12/2013 | ............. B22F 3/105 |
| WO | WO 2015155745 A1 | * | 10/2015 | ............. B22F 3/105 |

OTHER PUBLICATIONS

Machine translation of ES 2390533 T3 performed on Apr. 15, 2022, Simmons (Year: 2012).*
Machine translation of JP 3370203 B2 performed on Apr. 15, 2022, Ichikawa et al. (Year: 2003).*
Machine translation of ES 2390533 T3 performed on Mar. 21, 2023, Simmons (Year: 2012).*
Machine translation of KR 20140048246 A performed on Jun. 1, 2023, Kennedy et al. (Year: 2014).*
Machine translation of DE 10351176 A1 performed on Jun. 1, 2023, Zeiss et al. (Year: 2005).*
Machine translation of KR 20140048246 A1 performed on Apr. 15, 2024, Kennedy et al. (Year: 2014).*
Ding et al. "Wire-Feed Additive Manufacturing of Metal Components: Technologies, Developments and Fugure Interests," Int. J. Adv. Manuf. Technol., vol. 81, pp. 465-481, 2015.
Hickey, "NASA Eyes 3-D Printing Technology for Mars Colonization," Newsmax, 1 page, 2015.
NASA Press Release Sparks Fly as NASA Pushes the Limites of 3-D Printing Technology, Release 14-233, 3 pages, 2014.

* cited by examiner

LASER-ASSISTED ADDITIVE MANUFACTURING

CROSS-REFERENCE TO RELATED APPLICATIONS

The present application is a Division of application Ser. No. 14/969,190 filed Dec. 15, 2015, which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to additive manufacturing and more particularly to laser-assisted additive manufacturing.

State of Technology

This section provides background information related to the present disclosure which is not necessarily prior art.

Additive manufacturing (AM) was first developed in the 1980s but its adaptation in industrial production has only very recently emerged as a viable technology. To form the individual parts, thermal energy obtained from a source (such as from a laser or an ion beam) selectively fuses material deposited in either a) a powder bed, via layer by layer deposition or b) powder that is supplied to a laser-heated spot using particle-gas flow injection nozzles The powder is subsequently melted at least partially that quickly solidifies and fuses with the substrate (typically composed of previously fused layers). A single laser is responsible for providing the energy in all process steps, namely, the heating and melting of the particles and the heating and melting of the substrate.

The quality of the wetting (adjoining of the additive material with the substrate material) depends on multiple parameters including the laser parameters, the powder particle parameters, thermodynamic and material strength parameters and surface chemistry including the presence of an oxide layer in both, the powder material and the substrate. Although the potential of additive manufacturing for rapid prototyping, manufacturing of parts that are otherwise impossible to make with other methods or just as a general purpose method is well recognized, the quality of the materials currently produced is limited, hindered by quality issues, such as undesired porosity, delamination of layers, shrinkage, poor surface finish, dimensional and form errors, as well as strong residual thermal stresses.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor has developed laser additive manufacturing apparatus, systems, and methods for the fabrication of high quality freeform high value structures. The inventor's apparatus, systems, and methods utilize a material powder that is composed of nearly spherical particles having a narrow range of spatial dimensions or nearly spherical particles having a wide range of spatial dimensions or having varying particle size and shape as raw material. It can also be adopted to use a wire as the feed material. This additive manufacturing apparatus, system, and method provides optimized structural quality of the fabricated solid material by using separate laser sources to facilitate the energy deposition in each stage of the process to most efficiently control the material parameters of the manufactured part. This apparatus, system, and method also include a process step for the removal of the oxidized or otherwise contaminated layer of the powder particles or feed wire. In one embodiment this apparatus, system, and method includes another process step to incorporate on line laser-assisted forging of the material. The apparatus, system, and method are compatible with operation in a vacuum environment. This is enabled by using a powder delivery system and powder flow control system that is using the gravity (weight of the particles) as the only force to control the flow of the powder. Furthermore, the powder is confined into a jet of particles that serves as the delivery platform of the raw material into the material fusion point. Alternatively, the system may use a wire that is mechanically driven in to the fusion point.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
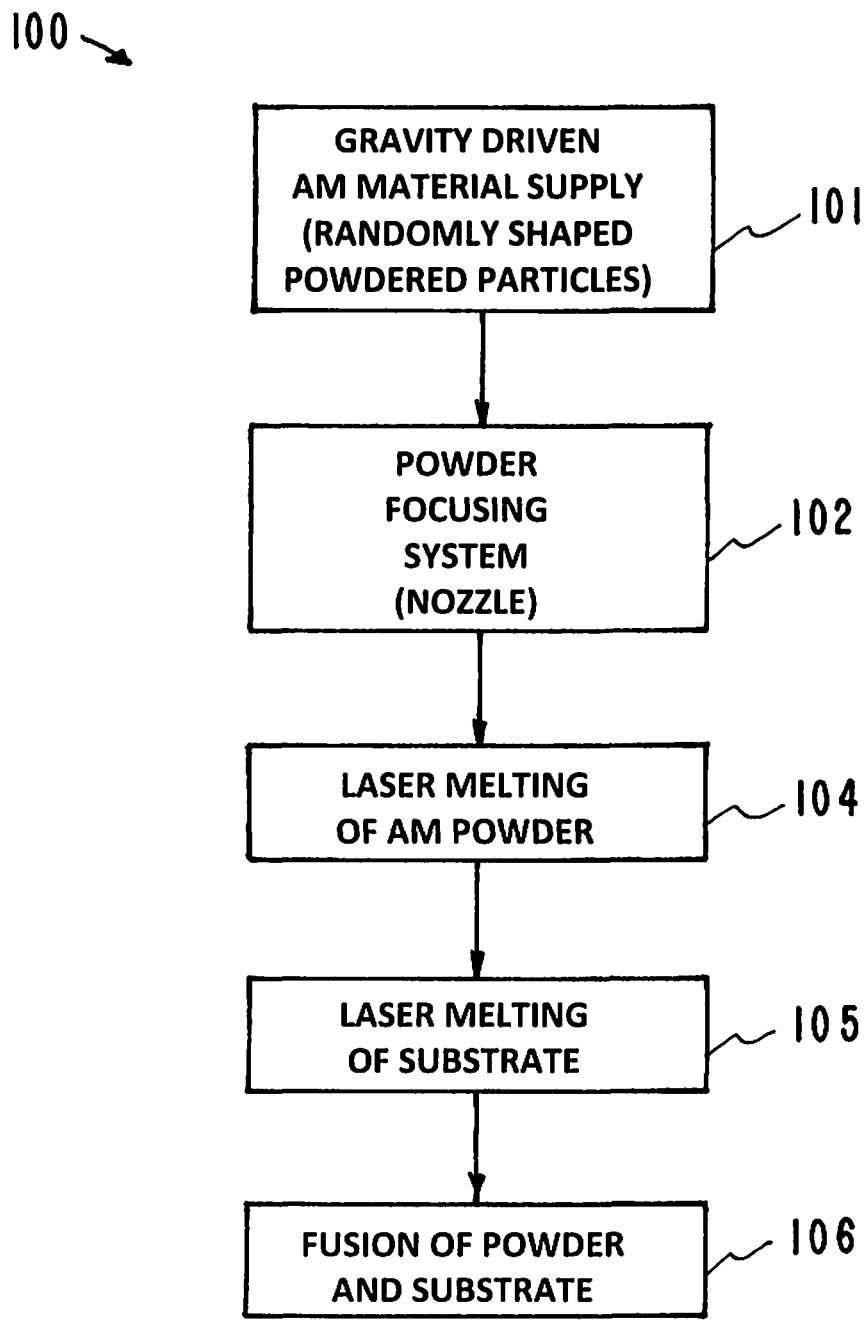
FIGS. 1A through 1E are flow charts illustrating embodiments of the inventor's apparatus, systems, and method that utilize a powder delivery system and powder flow control system.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The quality of additively manufactured parts produced by existing additive manufacturing systems is limited and hindered by quality issues, such as undesired porosity, delamination of layers, shrinkage, poor surface finish, dimensional and form errors, as well as strong residual thermal stresses. To address these issues, the inventor's laser-assisted additive manufacturing system uses laser sources that provide removal of the oxidized and/or contaminated surface layer of the powder particles and to more precisely control the temperature of the material and material state at the point of additive material fusion and in the adjacent areas. Furthermore, optionally separately laser sources are used for the melting of the powder particles and the substrate. Additionally laser source or sources can be used to tailor the stress fields in the fused material to provided desired enhancements of the manufactured part material quality and properties. The inventor's laser-assisted additive manufacturing system also includes the use of a laser for surface polishing or the use of a friction stir process or other process to control the surface quality of the manufactured part.

Referring to the drawing figures, and in particular to FIGS. 1A through 1E, flow charts illustrate embodiments of the inventor's apparatus, systems, and method that utilize a powder delivery system and powder flow control system. The embodiments that utilize a powder delivery system and powder flow control system are designated generally by the reference numeral 100.

Turning now to FIG. 1A, an embodiment 100 of the inventor's apparatus, systems, and method that utilize a powder delivery system and powder flow control system is illustrated in a flow chart. As illustrated in the flow chart, the system 100 includes a number of steps. The steps of the inventor's apparatus, systems, and methods 100 in FIG. 1 are identified and described below.

Step 1—Provide a Gravity Driven AM Material Supply (Reference Numeral 101)
Step 2—Provide a Powder Focusing System (Reference Numeral 102)
Step 3—Provide Laser Melting of Powder (Reference Numeral 104)
Step 4—Provide Laser Melting of Substrate (Reference Numeral 105)
Step 5—Fusion of AM Material and Substrate (Reference Numeral 106)

FIG. 1 is a flow chart that provides a simplified depiction of the inventor's apparatus, systems, and methods 100. The depiction shows the use of a material (MT) that can be a metal, a metal alloy, or other type of material that can be used for laser assisted additive manufacturing of solid state parts. The main steps of this version of the inventor's apparatus, systems, and methods 100 include:

AM Material Supply—Delivery of AM Material using a gravity-driven supply. The AM Material can be prefabricated MT powder particles and can be of random shape and size.

Powder Focusing—This is accomplished by a free-fall nozzle producing a low speed stream (jet) of particles. Ultrasound techniques of moving the particles can be included in various embodiments.

Melting Powder—The powder in the stream of particles is melted using an energy beam. For example, melting of the MT particles can be accomplished via exposure to the energy beam such as an elongated (slit) laser beam. The beam is arranged to intercept the particle stream. The stream or jet of particles is directed linearly along an axis to the substrate and the build layers. The particles should not be diverted from this linear path along the axis to the substrate and the build layers. This can be accomplished using a set of symmetrically positioned energy beams.

Melting Substrate—Melting a small volume of the substrate (exposed surface of the AM part) at the point of impingement and fusion of the melted MT particles or droplets using a laser beam.

Fusion of Powder and Substrate/Previous Layer—The various layers of the part are produced by fusing the powder. The system 100 includes means for rotational/translational control of the part to enable free-form material deposition.

There are numerous features incorporated in the inventor's apparatus, systems, and methods 100 that provide significant enhancements compared to conventional additive manufacturing approaches. First, it does not require the use of specialized material forms (such as powder of spherical particle). Second, it is compatible with implementation in a vacuum environment. Third, it involves a nearly complete incorporation of the raw material into the manufactured part. Fourth, the material fusion is preceded by a process step for removing the oxidized and/or contaminated layer of the additive raw material (particles or wire). Fifth, optional process steps may be included such as forging the material can be included or polishing the surface of the material or micromachining the surface of the fused material, each step using suitable laser beam(s).

Removal of the oxide and/or contamination layer of the material can often be very important. Oxidation and/or contamination issues are known to be a major problem in additive manufacturing. The quality of wetting of the particles to the substrate can be compromised by the oxidized and/or contaminated layers (that may be present in both material components) leading to poor fusing and generation of structural defects discussed above.

A vacuum environment may be advantageous for certain AM applications such as when avoiding oxidation of the material during the manufacturing process is important. In addition, adaptability for operation in a vacuum environment enables its realization in adverse environments such as in space (outside the atmosphere of earth). The laser AM design disclosed here features optimized material processing capabilities in a setting that is compatible with operation in a vacuum environment.

It is to be understood that in other embodiment of the inventor's apparatus, methods, and methods, the laser beam can be replaced by a different directed energy source such as an ion beam.

The inventor's apparatus, systems, and methods 100 incorporate a series of process steps designed to provide optimization of the manufactured material quality. The process steps are intended for the fabrication of high quality, high value materials such as biocompatible metal parts including titanium, Co—Cr alloys, 316L stainless steel, nitinol or other type of titanium alloys. The process steps can be implemented in the vacuum or in a gas atmosphere. The entire set of process steps or a specific subset described therein can be used in combination with various materials for the fabrication of high quality, high value (for their intended application) parts, such as implants for use in medicine, jewelry or other wearable items, or freeform parts or shapes with optimized structural and surface quality.

Figure 1B:
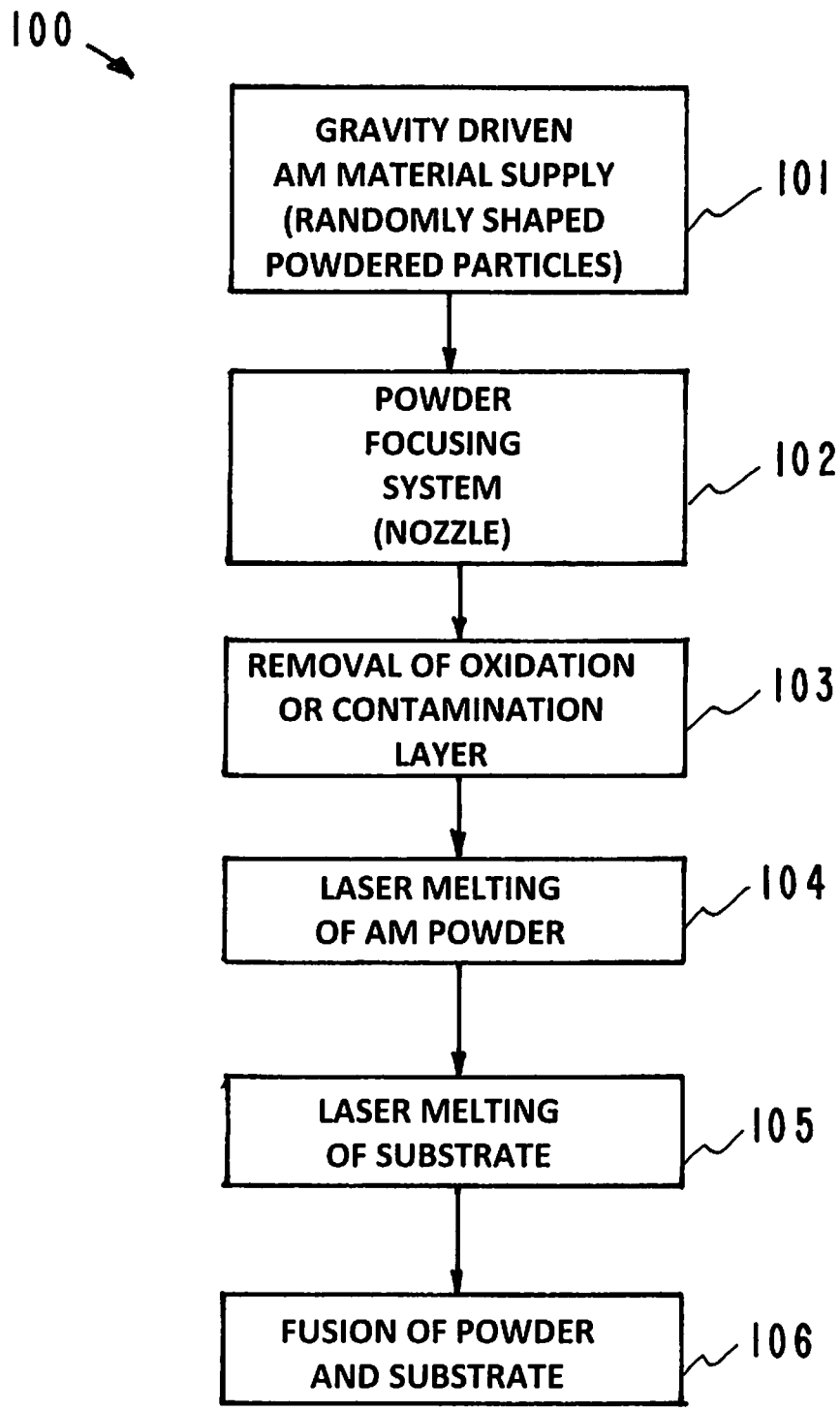

Referring now to FIG. 1B, another embodiment 100 of the inventor's apparatus, systems, and method that utilize a powder delivery system and powder flow control system is illustrated in another flow chart. The system 100 includes a number of steps which are identified and described below.

Step 1—Provide a Gravity Driven AM Material Supply (Reference Numeral 101)
    Step 2—Provide a Powder Focusing System (Reference Numeral 102)
    Step 3—Removing Oxidation and/or Contamination Layer (Reference Numeral 103)
    Step 4—Provide Laser Melting of Powder (Reference Numeral 104)
    Step 5—Provide Laser Melting of Substrate (Reference Numeral 105)
    Step 6—Fusion of AM Material and Substrate (Reference Numeral 106)

FIG. 1A illustrates the main steps of the inventor's apparatus, systems, and methods. The version illustrated in FIG. 1B includes the step of removing the oxidation and/or contamination layer (Reference Numeral 103). This is accomplished by ablation of the oxidized and/or contamination layer of the particles using an energetic beam or beams. For example, his can be accomplished using a set of symmetrically positioned laser beams.

Figure 1C:
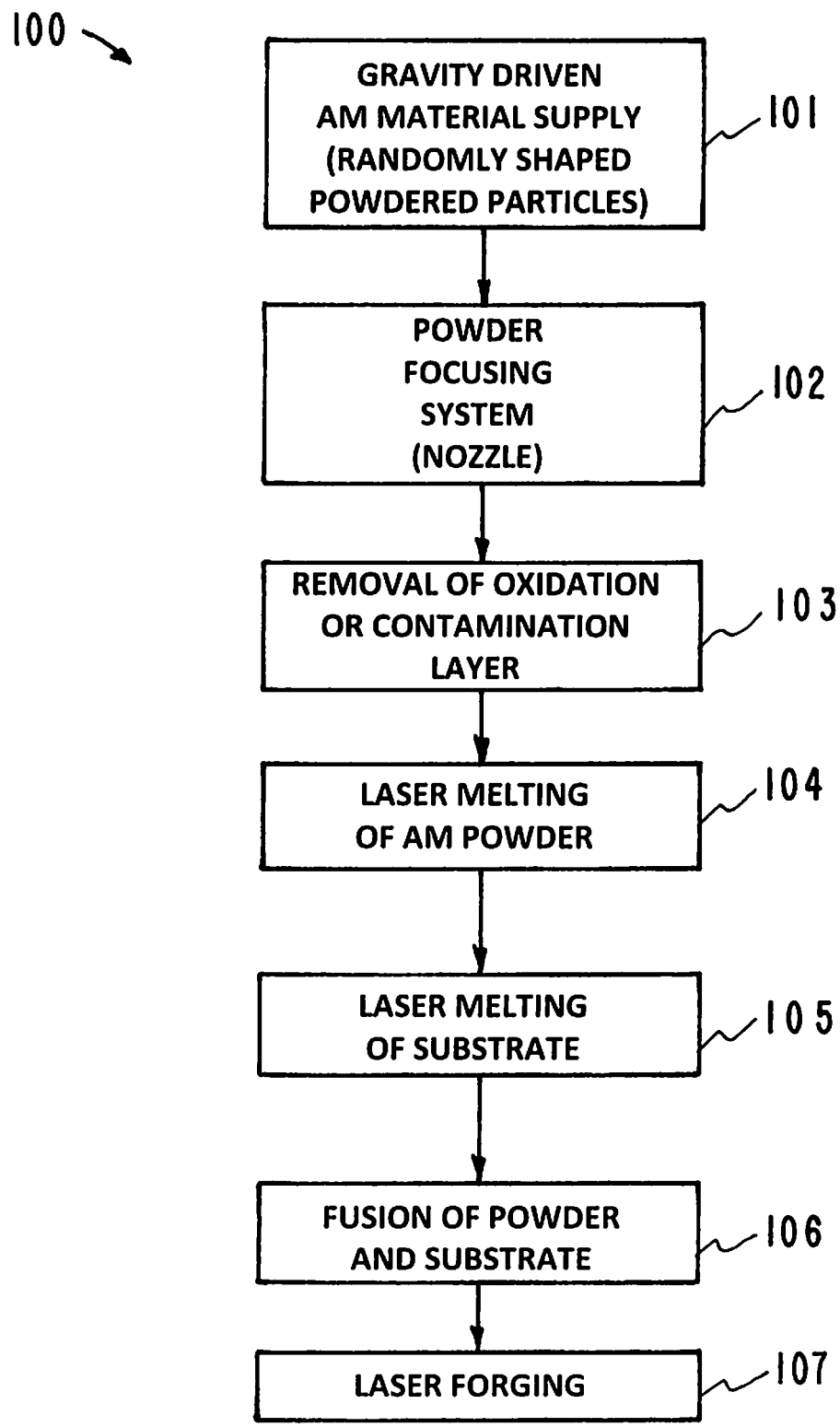

Referring now to FIG. 1C, yet another embodiment 100 of the inventor's apparatus, systems, and method that utilize a powder delivery system and powder flow control system is illustrated in another flow chart. The system 100 includes a number of steps which are identified and described below.

Step 1—Provide a Gravity Driven AM Material Supply (Reference Numeral 101)
    Step 2—Provide a Powder Focusing System (Reference Numeral 102)
    Step 3—Removing Oxidation—Contamination Layer (Reference Numeral 103)
    Step 4—Provide Laser Melting of Powder (Reference Numeral 104)
    Step 5—Provide Laser Melting of Substrate (Reference Numeral 105)
    Step 6—Fusion of AM Material and Substrate (Reference Numeral 106)
    Step 7—Laser Forging (Reference Numeral 107)

FIGS. 1A and 1B have illustrated steps of the inventor's apparatus, systems, and methods. The version illustrated in FIG. 1C includes laser forging (Reference Numeral 107). One or more additional lasers can be used to enable in-line forging of the AM part via application of a pressure generated by ablation of a thin superficial layer of the material after fusion.

Figure 1D:
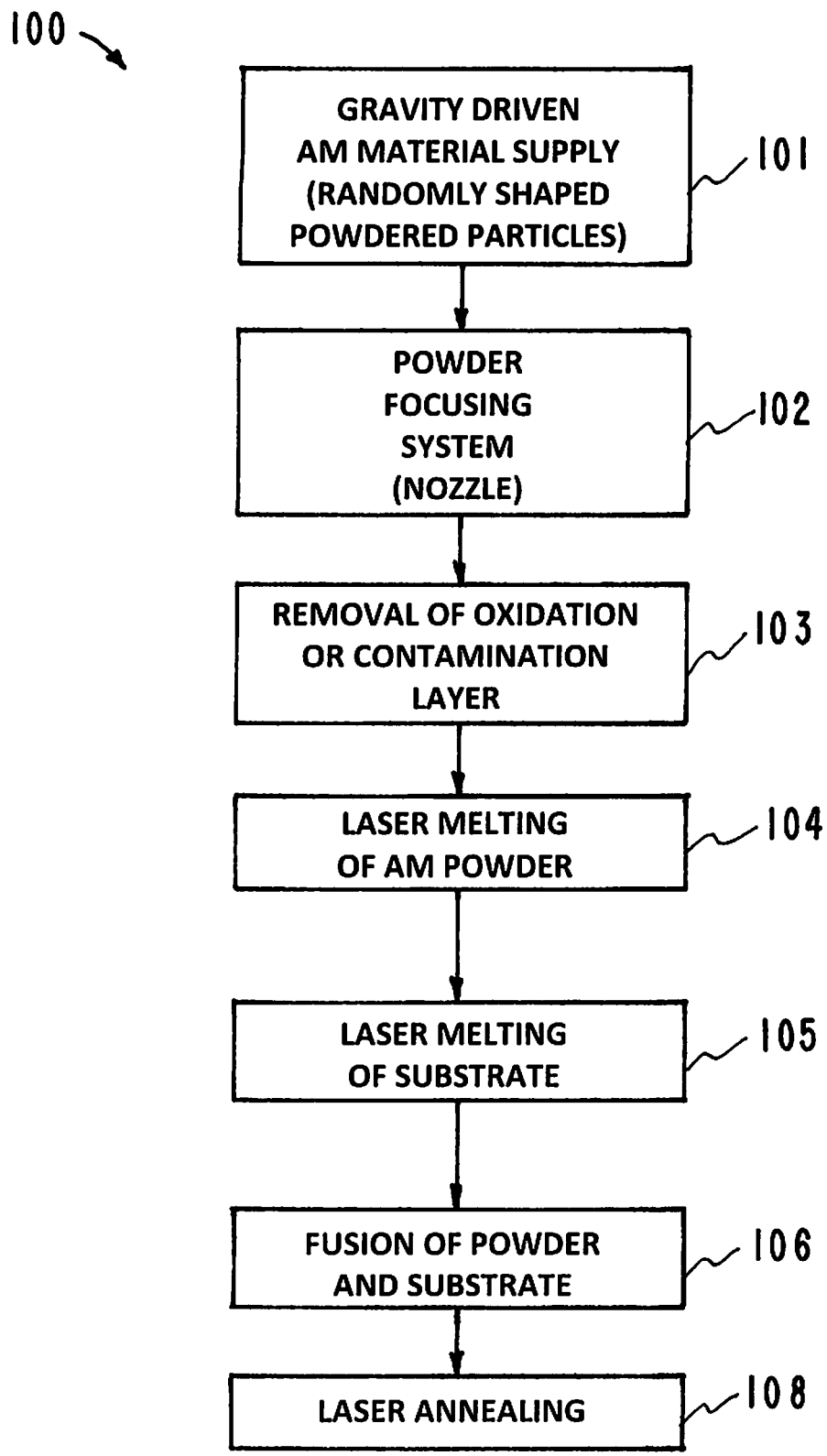

Referring now to FIG. 1D, another embodiment 100 of the inventor's apparatus, systems, and method that utilize a powder delivery system and powder flow control system is illustrated in another flow chart. The system 100 includes a number of steps which are identified and described below.

Step 1—Provide a Gravity Driven AM Material Supply (Reference Numeral 101)
    Step 2—Provide a Powder Focusing System (Reference Numeral 102)
    Step 3—Removing Oxidation—Contamination Layer (Reference Numeral 103)
    Step 4—Provide Laser Melting of Powder (Reference Numeral 104)
    Step 5—Provide Laser Melting of Substrate (Reference Numeral 105)
    Step 6—Fusion of AM Material and Substrate (Reference Numeral 106)
    Step 7—Laser Annealing (Reference Numeral 108)

FIGS. 1A and 1B have illustrated steps of the inventor's apparatus, systems, and methods. The version illustrated in FIG. 1D includes laser annealing (Reference Numeral 108). One or more additional lasers can be used to enable in-line annealing of the AM part to remove internal stress in the metal part.

Figure 1E:
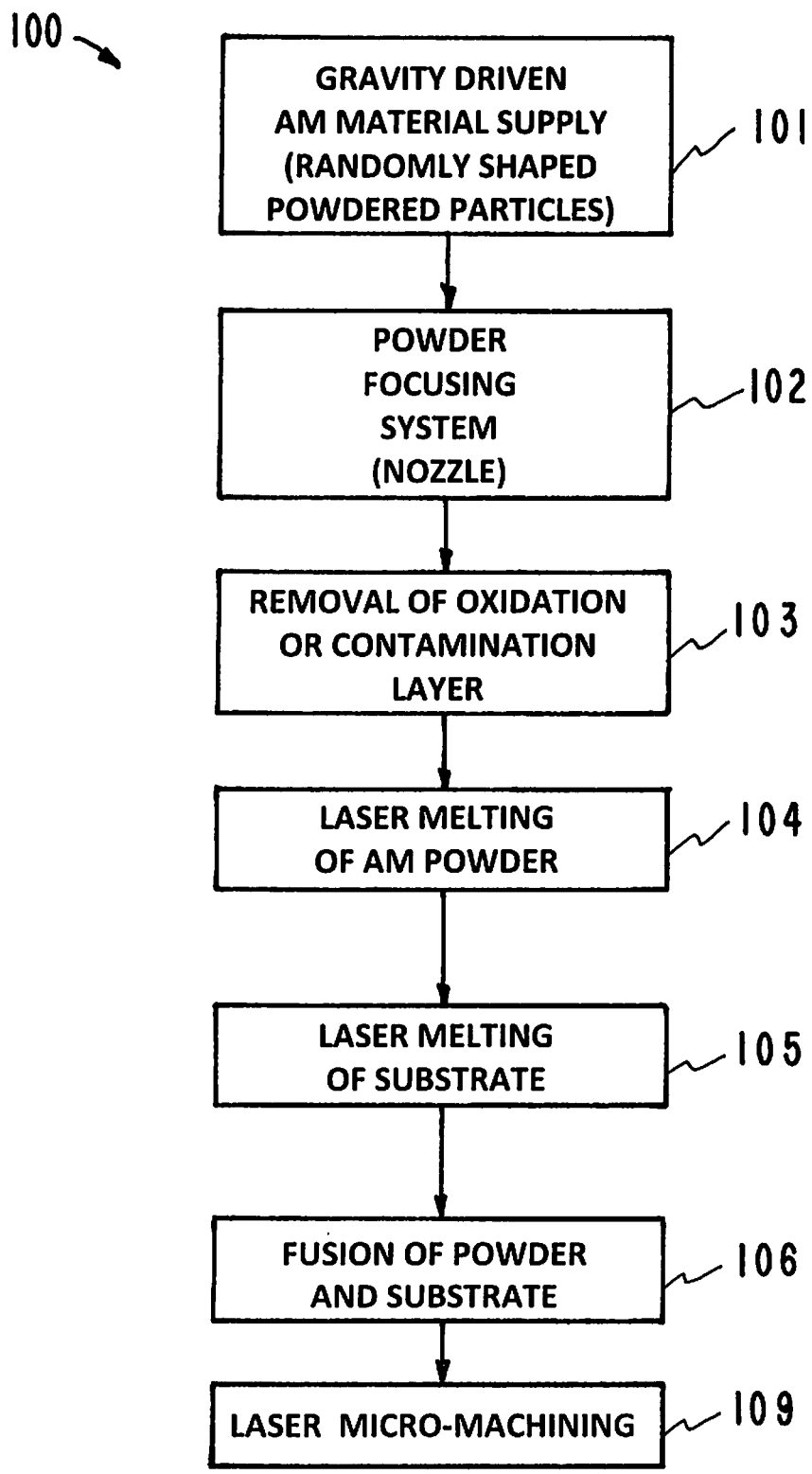

Referring now to FIG. 1E, another embodiment 100 of the inventor's apparatus, systems, and method that utilize a powder delivery system and powder flow control system is illustrated in another flow chart. The system 100 includes a number of steps which are identified and described below.

Step 1—Provide a Gravity Driven AM Material Supply (Reference Numeral 101)
    Step 2—Provide a Powder Focusing System (Reference Numeral 102)
    Step 3—Removing Oxidation—Contamination Layer (Reference Numeral 103)
    Step 4—Provide Laser Melting of Powder (Reference Numeral 104)
    Step 5—Provide Laser Melting of Substrate (Reference Numeral 105)
    Step 6—Fusion of AM Material and Substrate (Reference Numeral 106)
    Step 7—Laser Micro-machining (Reference Numeral 109)

FIGS. 1A and 1B have illustrated steps of the inventor's apparatus, systems, and methods. The version illustrated in FIG. 1E includes laser micro-machining (Reference Numeral 109). One or more additional lasers can be used to enable micro-machining of the metal part.

Referring now to FIGS. 2A through 2E, flow charts illustrate embodiments of the inventor's apparatus, systems, and method that utilize a wire delivery and control system. The embodiments that utilize a wire delivery system and wire control system are designated generally by the reference numeral 200. The main steps of the embodiments of the inventor's apparatus, systems, and methods 200 include (1) Delivery of wire as the feed material, (2) Ablation of the oxidized layer of the wire using a set of symmetrically positioned laser beams, (3) Melting of the wire via exposure to an elongated (slit) laser beam. The beam is arranged to intercept the wire, (4) Melting a small volume of the substrate (exposed surface of the AM part) at the point of impingement and fusion of the melted wire using a laser beam, (5) Means for rotational/translational control of the part to enable free-form material deposition, (6) Optionally, one or more additional lasers are used to (A) enable in-line forging of the AM part via application of a pressure generated by ablation of a thin superficial layer of the material after fusion, (B) laser annealing of the part to reduce internal stress in the metal part, and (C) laser micro-machining of the part.

Figure 2A:
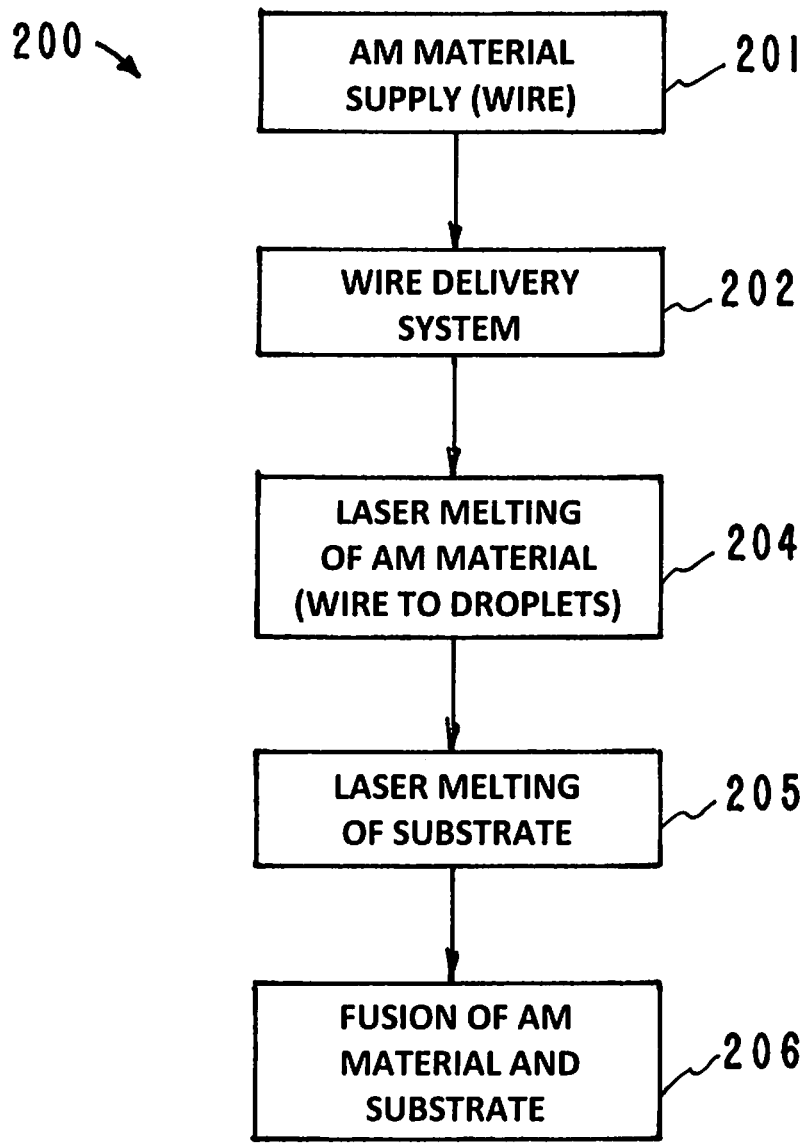
FIGS. 2A through 2E are flow charts illustrating embodiments of the inventor's apparatus, systems, and method that utilize a wire delivery system.

Turning now to FIG. 2A, an embodiment 200 of the inventor's apparatus, systems, and method that utilize a wire delivery system is illustrated in a flow chart. As illustrated in the flow chart, the system 200 includes a number of components. The steps of the inventor's apparatus, systems, and methods 200 illustrated in FIG. 2A are identified and described below.

Step 1—Providing a Wire as the Feed Material (Reference Numeral 201)
    Step 2—Delivering the Wire (Reference Numeral 202)
    Step 3—Laser Melting Wire (Reference Numeral 204)
    Step 4—Laser Melting Substrate (Reference Numeral 205)
    Step 5—Fusion of Wire and Substrate (Reference Numeral 206)

FIG. 2A is a flow chart that provides a simplified depiction of the embodiment of the inventor's apparatus, systems, and methods 200. The depiction shows the use of a wire that can be made of a metal, a metal alloy, or other type of material that can be used for laser assisted additive manufacturing of solid state parts.

The inventor's apparatus, systems, and methods 200 incorporate a series of process steps designed to provide optimization of the manufactured material quality. The process steps are intended for the fabrication of high quality, high value materials such as biocompatible metal parts including titanium, Co—Cr alloys, 316L stainless steel, nitinol or other type of titanium alloys. The process steps can be implemented in the vacuum or in a gas atmosphere. The entire set of process steps or a specific subset described therein can be used in combination with various materials for the fabrication of high quality, high value (for their intended application) parts, such as implants for use in medicine, jewelry or other wearable items, or freeform parts or shapes with optimized structural and surface quality.

Figure 2B:
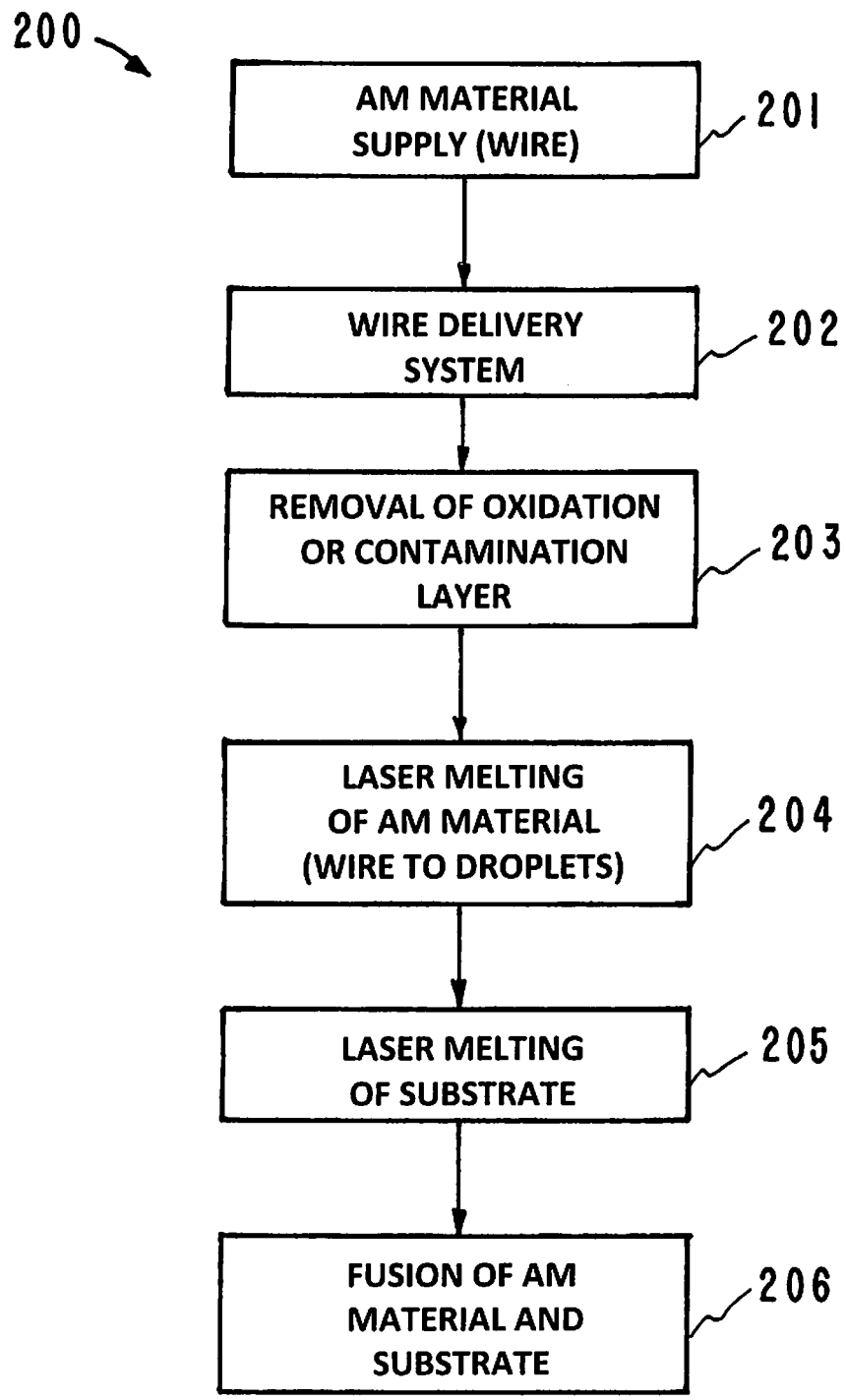

Referring now to FIG. 2B, another embodiment 200 of the inventor's apparatus, systems, and method that utilize a wire delivery system is illustrated in another flow chart. As illustrated in the flow chart, the system 200 includes a number of components. The steps of the inventor's apparatus, systems, and methods 200 illustrated in FIG. 2B are identified and described below.

Step 1—Providing a Wire as the Feed Material (Reference Numeral 201)
    Step 2—Delivering the Wire (Reference Numeral 202)
    Step 3—Removing Oxidation Layer (Reference Numeral 203)
    Step 4—Laser Melting Wire (Reference Numeral 204)
    Step 5—Laser Melting Substrate (Reference Numeral 205)
    Step 6—Fusion of Wire and Substrate (Reference Numeral 206)

Figure 2C:
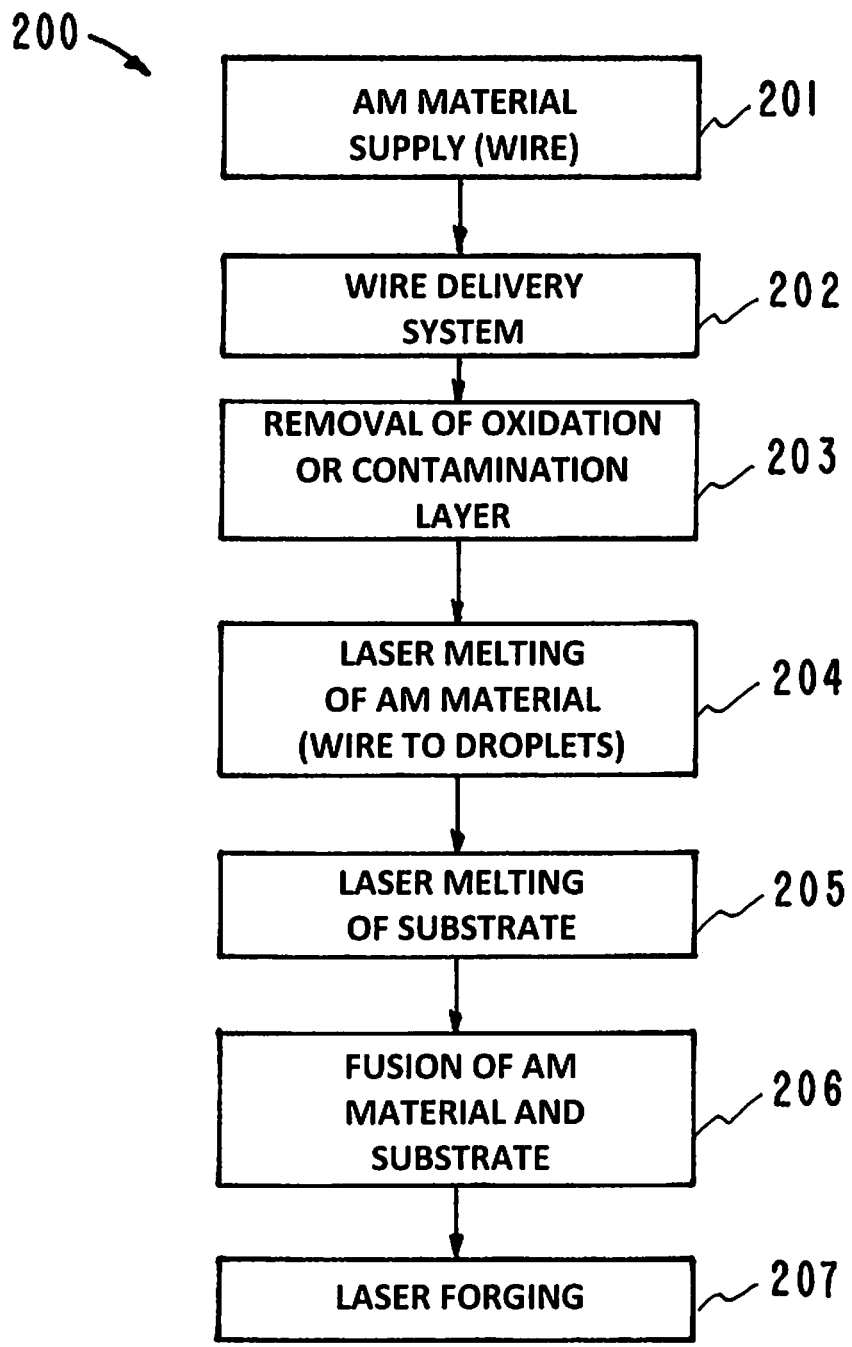

FIG. 2A illustrated the main steps of the inventor's apparatus, systems, and methods. The version illustrated in FIG. 2B includes the step of removing the oxidation and/or contamination layer (Reference Numeral 203). This is accomplished by ablation of the oxidized and/or contamination layer of the particles using a set of symmetrically positioned energy beams. This can be accomplished using a set of symmetrically positioned laser beams. Referring now to FIG. 2C, yet another embodiment 200 of the inventor's apparatus, systems, and method that utilize a wire delivery system is illustrated in another flow chart. As illustrated in the flow chart, the system 200 includes a number of components. The steps of the inventor's apparatus, systems, and methods 200 illustrated in FIG. 2C are identified and described below.

Step 1—Providing a Wire as the Feed Material (Reference Numeral 201)
    Step 2—Delivering the Wire (Reference Numeral 202)
    Step 3—Removing Oxidation Layer (Reference Numeral 203)
    Step 4—Laser Melting Wire (Reference Numeral 204)
    Step 5—Laser Melting Substrate (Reference Numeral 205)
    Step 6—Fusion of Wire and Substrate (Reference Numeral 206)
    Step 7—Laser Forging (Reference Numeral 207)

FIG. 2A illustrates the main steps of the inventor's apparatus, systems, and methods. The version illustrated in FIG. 2C includes the step of laser forging (Reference Numeral 207). One or more additional lasers can be used to enable in-line forging of the AM part via application of a pressure generated by ablation of a thin superficial layer of the material after fusion.

Figure 2D:
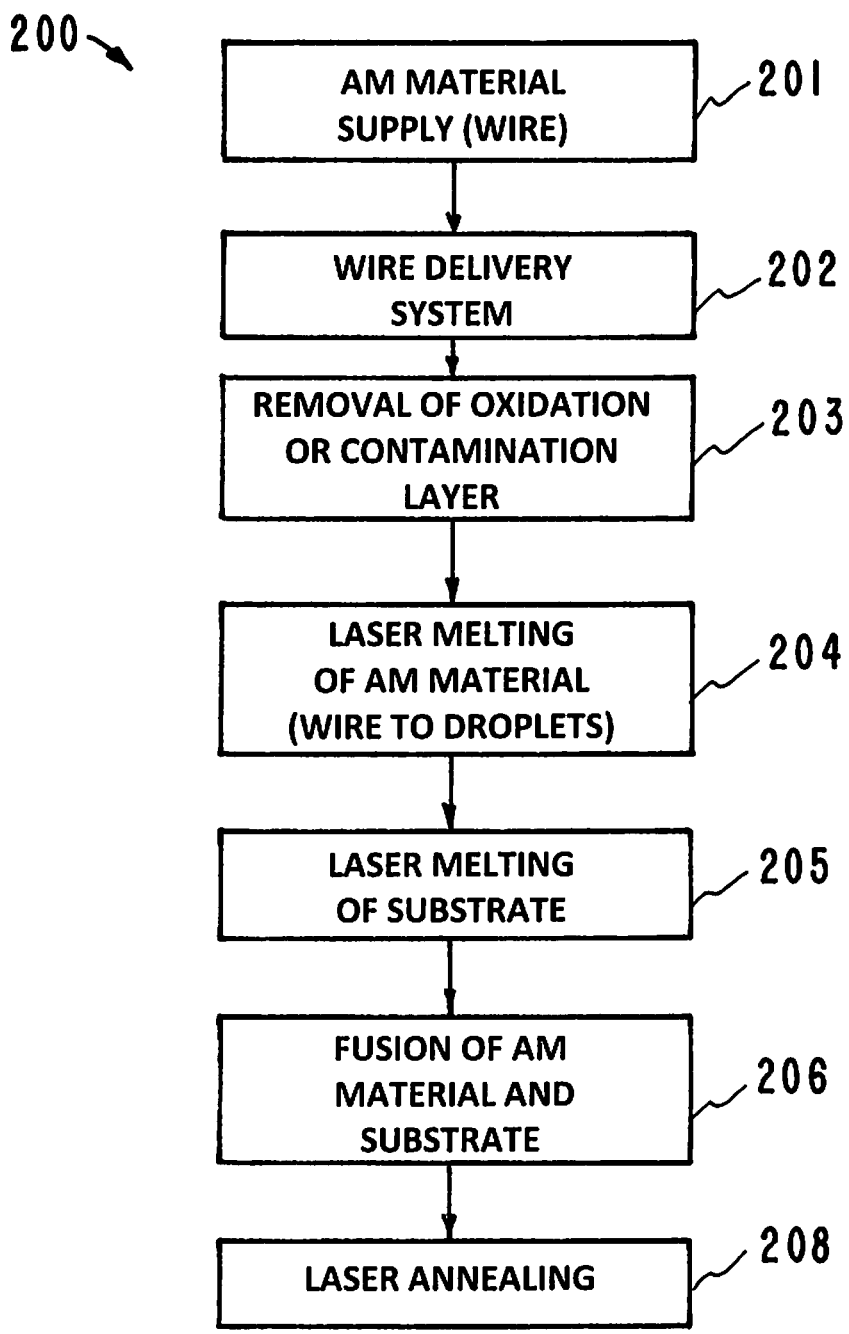

Referring now to FIG. 2D, yet another embodiment 200 of the inventor's apparatus, systems, and method that utilize a wire delivery system is illustrated in another flow chart. As illustrated in the flow chart, the system 200 includes a number of components. The steps of the inventor's apparatus, systems, and methods 200 illustrated in FIG. 2D are identified and described below.

Step 1—Providing a Wire as the Feed Material (Reference Numeral 201)
    Step 2—Delivering the Wire (Reference Numeral 202)
    Step 3—Removing Oxidation Layer (Reference Numeral 203)
    Step 4—Laser Melting Wire (Reference Numeral 204)
    Step 5—Laser Melting Substrate (Reference Numeral 205)
    Step 6—Fusion of Wire and Substrate (Reference Numeral 206)
    Step 7—Laser Annealing (Reference Numeral 208)

FIG. 2A illustrated the main steps of the inventor's apparatus, systems, and methods. The version illustrated in FIG. 2D includes the step of laser annealing (Reference Numeral 208). One or more additional lasers can be used to enable in-line annealing of the AM part to remove internal stress in the metal part.

Figure 2E:
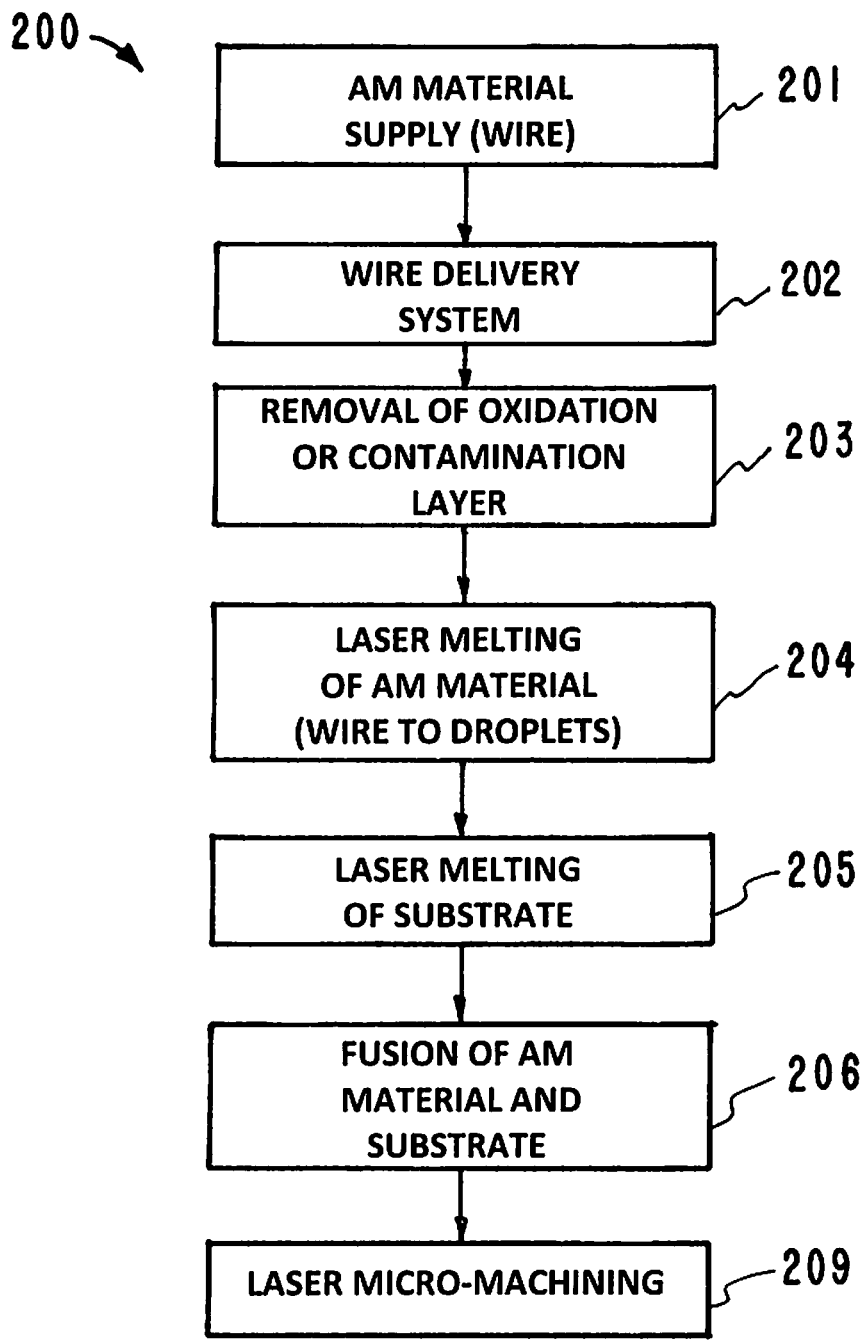

Referring now to FIG. 2E, another embodiment 200 of the inventor's apparatus, systems, and method that utilize a wire delivery system is illustrated in another flow chart. As illustrated in the flow chart, the system 200 includes a number of components. The steps of the inventor's apparatus, systems, and methods 200 illustrated in FIG. 2E are identified and described below.

Step 1—Providing a Wire as the Feed Material (Reference Numeral 201)
    Step 2—Delivering the Wire (Reference Numeral 202)
    Step 3—Removing Oxidation Layer (Reference Numeral 203)
    Step 4—Laser Melting Wire (Reference Numeral 204)
    Step 5—Laser Melting Substrate (Reference Numeral 205)
    Step 6—Fusion of Wire and Substrate (Reference Numeral 206)
    Step 7—Laser Micro-machining (Reference Numeral 109)

FIG. 2A illustrated the main steps of the inventor's apparatus, systems, and methods. The version illustrated in FIG. 2E includes laser micro-machining (Reference Numeral 209). One or more additional lasers can be used to enable micro-machining of the metal part.

Figure 3:
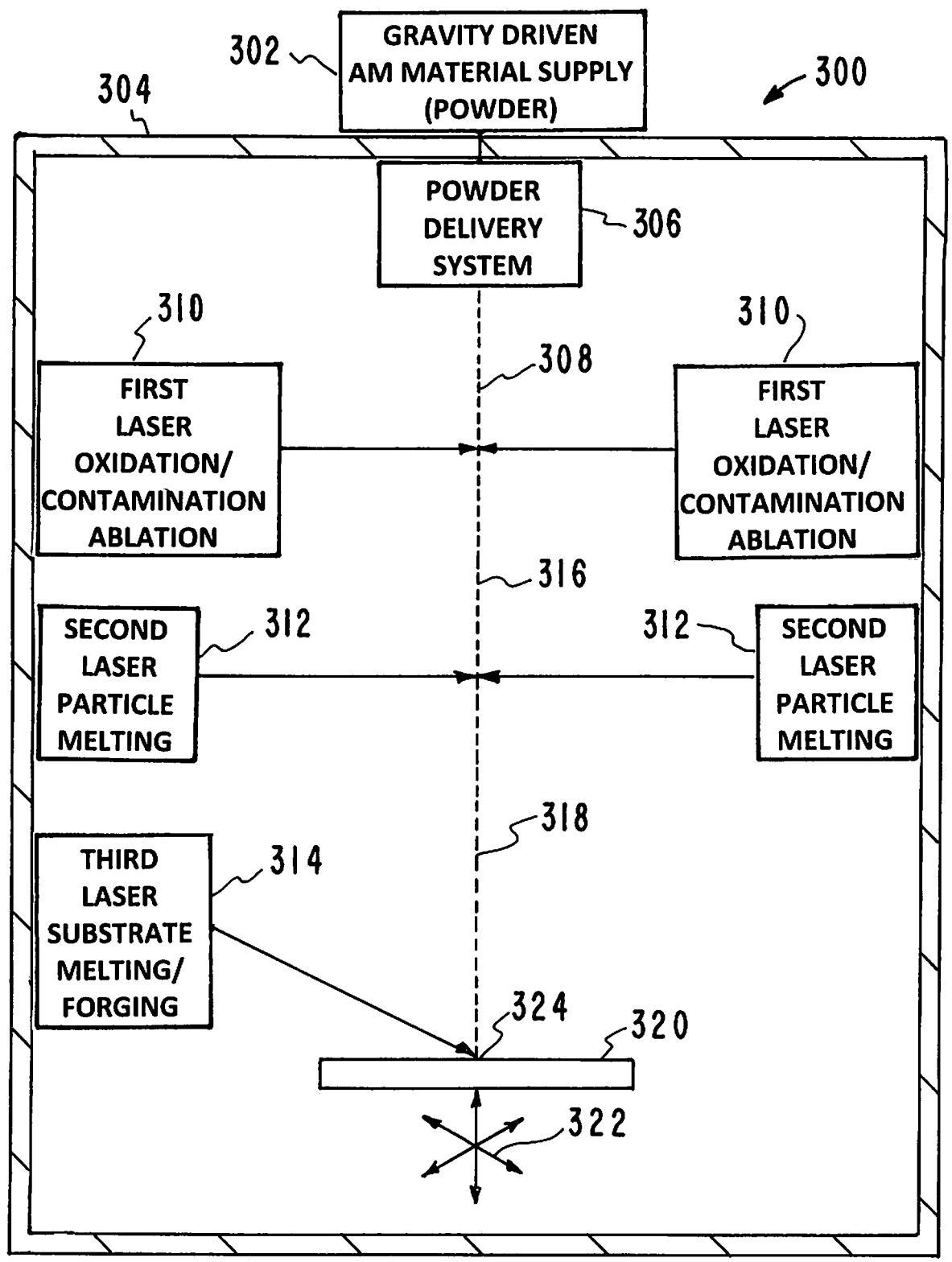
FIG. 3 is a simplified schematic depiction of embodiments of the inventor's apparatus, systems, and method that utilize a powder delivery system and powder flow control system.

Referring to FIG. 3, a simplified schematic depiction illustrates an embodiment of the inventor's apparatus, systems, and methods. This embodiment is designated generally by the reference numeral 300. As illustrated, the embodiment 300 includes a number of components. The components of the inventor's apparatus, systems, and methods 300 illustrated in FIG. 3 are identified and described below.

- Reference Numeral 302—Gravity Driven AM Material Supply (Powder)
- Reference Numeral 304—Vacuum or inert gas Chamber (optional)
- Reference Numeral 306—Gravity driven powder Delivery System
- Reference Numeral 308—Particle Stream
- Reference Numeral 310—First Lasers
- Reference Numeral 312—Second Lasers
- Reference Numeral 314—Third Lasers
- Reference Numeral 316—Particle Stream Oxidation and/or contamination Removed
- Reference Numeral 318—Melted Particle Stream
- Reference Numeral 320—Substrate
- Reference Numeral 322—Substrate multi-Axis Motion System
- Reference Numeral 324—Part Build Area The additive manufacturing system 300 uses a material (MT) that can be a metal, a metal alloy, or other type of material used for laser assisted additive manufacturing of solid state parts. The additive manufacturing system 300 uses a material powder having varying particle size and shape as raw material. This additive manufacturing system 300 provides optimized structural quality of the fabricated solid material by using separate laser sources to facilitate the energy deposition in each stage of the process to most efficiently control the material parameters and fusion process. This system 300 also includes a process step for the removal of the oxidized and/or contaminated layer of the powder particles. Furthermore, the system 300 includes a process step to incorporate on line laser-assisted forging of the material. Moreover, the system 300 is compatible with operation in a vacuum environment.

The description of the additive manufacturing system components illustrated in FIG. 3 having been completed, the operation and additional description of the individual components will now be considered in greater detail below.

Reference Numeral 302—Gravity Driven AM Material Supply

The AM material 302 in the form of a powder is delivered to the powder delivery system 306. The powder in at least one embodiment is in the form of randomly shaped powder particles. Powder delivery systems are commercially available and there are a number of reports, involving experimental and modeling studies, that deal with specific aspects of such design.

Reference Numeral 306—Powder Delivery System

The requirement for operation in a vacuum environment necessitates the employment of a suitable powder flow control and powder-dispersing and spatial control (nozzle) system. This nozzle should also be able to handle randomly shaped MT particles. The inventor has determined that a suitable type of design is the gravity-driven, free-fall type of nozzles. Such designs use the angle of repose between a moving surface in contact with the powder exiting from a tube or similar structure that is in proximity with the moving surface. Ultrasound techniques of moving the particles can be included in various embodiments. Alternatively, the powder may be pulled from a contained structure using and auger like devise or other mechanical means to extract the powder at a controlled rate. Additional methods to control the powder flow can involve electrophoretic, electrostatic, magnetophoretic, electrostatic or other physical mechanisms that can exert forces on the powder particles that can be used to control its flow and the direction of motion. The powder is subsequently directed through a device to form a powder jet with desired spatial dimensions (cross sectional area and shape). This device may be a nozzle that directs the flow of the powder particles through a small opening or other method including noncontact methods that physical mechanisms that can exert forces on the powder particles that can be used to control the spatial dimensions of the jet.

Reference Numeral 316—Removal of Oxidized and/or Contaminated Layer

Oxidation of the powder or wire (Creating an Oxidation/Contamination Layer on the Powder or Wire) used as raw material can be introduced either during production and/or during storage and delivery to the free-fall nozzle. It is possible to employ a laser-based method to remove the oxidized layer prior to its incorporation into the AM part. This can be done by intercepting the particles with a set of symmetrically arranged pulsed laser beams before they enter the heating phase or even before entering the nozzle. It is therefore feasible to incorporate an optional "cleaning" step to address oxidation or other type of surface contamination issues if present. This process step can also be implemented using a wire as the raw material form.

Reference Numeral 318—Laser Melting of Additive Material

The temperature of the MT particles released by the nozzle is subsequently raised above the melting point using energy deposited by an appropriately arranged laser beam such as a slit laser beam (generated using appropriate optics such as cylindrical lenses). Considering known optical material degradation issues when operating in a vacuum environment, a continuous wave (CW) or quasi-CW laser systems may be more suitable for this application. The surface tension of the melted material will determine its final shape.

Reference Numeral 314—Laser Melting of Substrate

A laser (or other type of directed energy) beam is used to melt a surface layer of substrate material. This provides laser melting of the substrate at the point of additive material fusion. It is well known that laser heating of the surface of materials can improve the surface quality. For example, lasers have been used in the context of improving the damage threshold of optical materials, for the production of low cost manufacturing of optical components and for the polishing of metal surfaces. Consequently, this approach provides inherent benefits allowing the production of a high quality surface of the AM manufactured part. The quality of the AM part developed using the disclosed system will be significantly improved in terms of its crystalline structure, quality of the surface and residual stresses. A low particle velocity along with the low stress in the (thermo-dynamically stable) liquid pool will enable full incorporation of the particle without splattering and/or transient stress or instability related material ejection (typical in current AM methods). This in turn will enable near complete use of the raw (powder or wire) material into the AM MT part.

Reference Numeral 314—On-Line Laser Forging

Forging is one of the oldest metalworking processes involving the shaping of metal using localized compressive forces. Within the general AM system 300, the "forging" compressive force can be applied at any point during the transition of the fused material from the liquid to the solid state phase. If the temperature is above the material's recrystallization temperature, it is deemed "hot forging" and is known to reduce the possibility for formation of voids, to improve the crystal microstructure, to support a continuous grain flow and finer grain size and to increase the strength of the material. It can also be applied non-uniformly within the area of heated/liquid material as means to enhance the capability to shape the surface at a finer spatial scale than that of the particle jet or wire. It is also known that such "forging" process has additional benefits in some materials and application such as increase the material strength (typically referred to as laser peening) or generate surfaces that are more resistant to oxidation and other types of degradation. Furthermore, it can be applied to produce localized tailored stresses to meet specific requirements of the fabricated part. The as forming part can be kept at an elevated temperature during the manufacturing process to maintain a small temperature difference between the melt pool and the surrounding material. The temperature can be reduced to ambient at the end of the manufacturing process. This will facilitate minimizing the residual stress of manufacture material and/or address other potential temperature related material quality issues. Additional processing can be applied on the surface of the formed substrate to enhance its structural properties, control its surface roughness and control its shape at a smaller spatial scale.

Reference Numeral 306—Alloy Fabrication

The particle delivery system can be tailored to simultaneously draw particles from different material particle containers at predetermined and/or adjustable flow rates. This can enable fabrication of alloys within the AM system 300. Furthermore, the alloy composition can be locally tailored during the AM of the part.

Reference Numeral 324—Additive Manufacturing Build Rate

The build rate of the system 300 depends on the amount of material fused to the substrate per unit time. This build rate can be increased or can also be decreased depending on various designing parameters such as the desired spatial resolution (which can be adjusted to vary during manufacturing).

Reference Numeral 300—System Design and Additional Features

The description above is general and entails the major process steps and features of the design. Additional supplementary design features can be incorporated to meet specific needs (associated with application specific requirements) such as specific additively manufactured material surface or crystalline quality, strength, incorporation of impurities etc. Although FIG. 3 depicts the integrated system contained within one vacuum chamber, the system described is fully adaptable to a chamber that contains a gas composition at any pressure or just ambient atmospheric air. In the latter case, there would be no need to have a chamber enclosing the AM system. Furthermore, each of the process steps can be isolated to different sub-chambers. This can be a solution of choice in order to isolate processes that can introduce undesired degradation of the manufactured material. For example, the raw material can be kept in a separate compartment. Similarly, the oxidation (or contamination) removal process can be performed in a separate sub-chamber in order to isolate the byproducts from the compartment that encompasses the material fusion processes. The sub-chambers can be interconnected via only the particle delivery nozzles. In addition, a differential pressure between sub-chambers can be used to contain the movement of byproducts between compartments.

Figure 4:
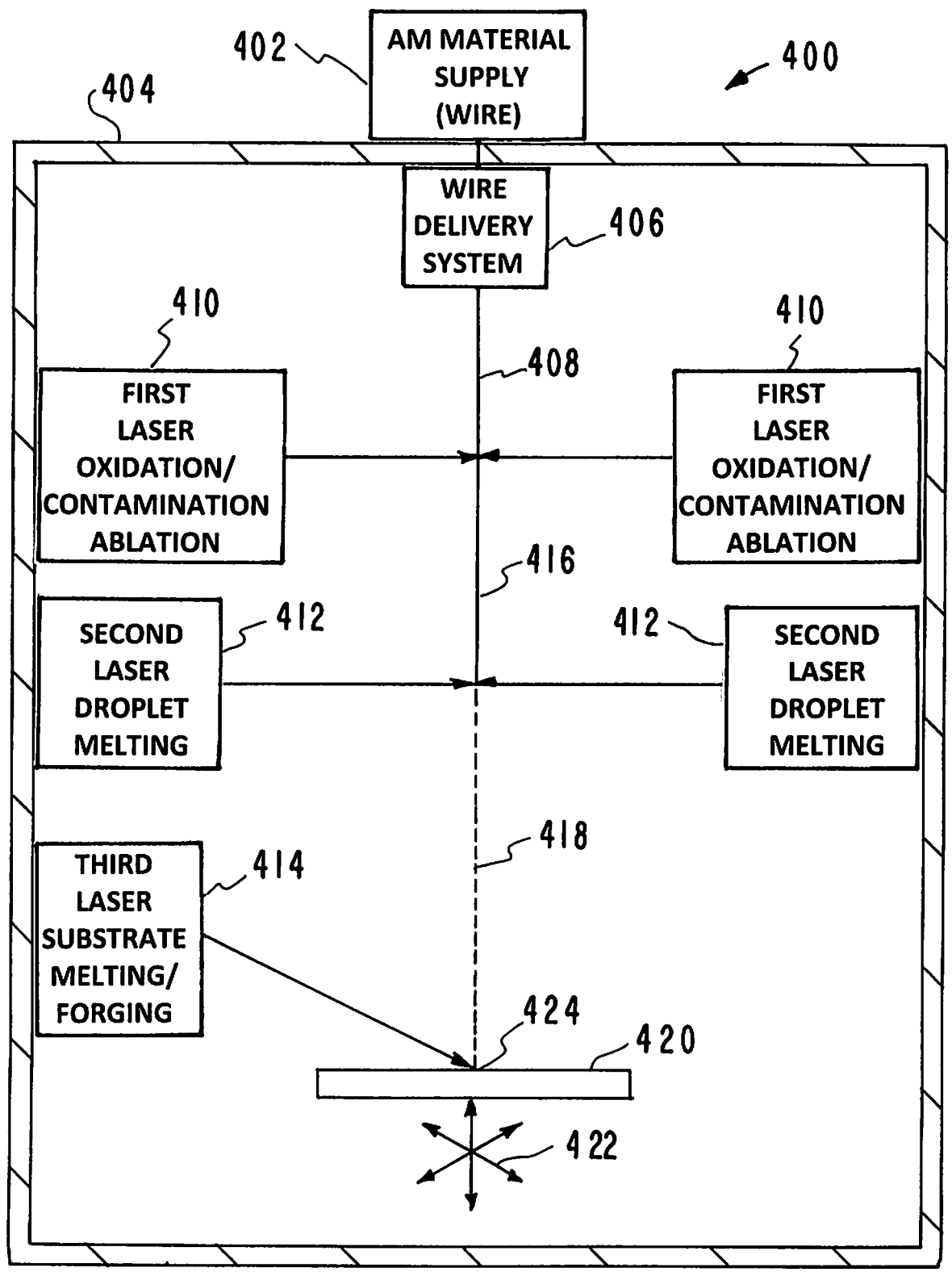
FIG. 4 is a simplified schematic depiction of embodiments of the inventor's apparatus, systems, and method that utilize a wire delivery system.

Referring to FIG. 4, a simplified schematic depiction illustrates another embodiment of the inventor's apparatus, systems, and methods. This embodiment is designated generally by the reference numeral 400. As illustrated, the embodiment 400 includes a number of components. The components of the inventor's apparatus, systems, and methods 400 illustrated in FIG. 4 are identified and described below.

Reference Numeral 402—AM Material Supply (Wire)

Reference Numeral 404—Vacuum Chamber

Reference Numeral 406—Wire Delivery System

Reference Numeral 408—Droplet Stream

Reference Numeral 410—First Lasers

Reference Numeral 412—Second Lasers

Reference Numeral 414—Third Lasers

Reference Numeral 416—Droplet Stream Oxidation Removed

Reference Numeral 418—Melted Droplet Stream

Reference Numeral 420—Substrate

Reference Numeral 422—Substrate 4 Axis Motion System

Reference Numeral 424—Part Build Area

The additive manufacturing system 400 uses a material (MT) that can be a metal, a metal alloy, or other type of material used for laser assisted additive manufacturing of solid state parts. The additive manufacturing system 400 uses a wire. This provides optimized structural quality of the fabricated solid material by using separate laser sources to facilitate the energy deposition in each stage of the process to most efficiently control the material parameters. This system 400 also includes a process step for the removal of the oxidized and/or contaminated layer of the powder particles. Furthermore, the system 400 includes a process step to incorporate on line laser-assisted forging of the material. Moreover, the system 400 is compatible with operation in a vacuum environment. The description of the additive manufacturing system components illustrated in FIG. 4 having been completed, the operation and additional description of the individual components will now be considered in greater detail below.

Reference Numeral 406—Wire Delivery

The system 400 employs a suitable wire. The inventor has determined that such a suitable wires are currently commercially available or can be manufactured using existing techniques.

Reference Numeral 416—Removal of Oxidized Layer

Oxidation and/or contamination of the wire used as raw material can be introduced either during production and/or during storage and delivery. It is possible to employ a laser-based method to remove the oxidized layer prior to its incorporation into the AM part. This can be done by intercepting the wire with a set of symmetrically arranged pulsed laser beams before it enters the heating phase. It is therefore feasible to incorporate an optional "cleaning" step to address oxidation or other type of surface contamination issues if present. This process step can be implemented using a wire as the raw material form.

Reference Numeral 418—Laser Melting of Wire

The temperature of the wire is subsequently raised above the melting point using energy deposited by an appropriately arranged laser beam such as a slit laser beam (generated using appropriate optics such as cylindrical lenses). Considering known optical material degradation issues when operating in a vacuum environment, a continuous wave (CW) or quasi-CW laser systems may be more suitable for this application.

Reference Numeral 414—Laser Melting of Substrate

A laser (or other type of directed energy) beam is used to melt a surface layer of substrate material. This provides laser melting of the substrate at the point of additive material fusion. The inventor has demonstrated that laser heating of the surface of materials can improve the surface quality. For example, lasers have been used in the context of improving the damage threshold of optical materials, for the production of low cost manufacturing of optical components and for the polishing of metal surfaces. Consequently, this approach provides inherent benefits allowing the production of a high quality surface of the AM manufactured part. The quality of the AM part developed using the disclosed system will be significantly improved in terms of its crystalline structure, quality of the surface and residual stresses. This in turn will enable near complete use of the raw wire material into the AM MT part.

Reference Numeral 414—On-Line Laser Forging

Forging is one of the oldest metalworking processes involving the shaping of metal using localized compressive forces. Within the general AM system 400, the "forging" compressive force can be applied at any point during the transition of the fused material from the liquid to the solid state phase. If the temperature is above the material's recrystallization temperature, it is deemed "hot forging" and is known to reduce the possibility for formation of voids, to improve the crystal microstructure, to support a continuous grain flow and finer grain size and to increase the strength of the material. It can also be applied non-uniformly within the area of heated/liquid material as means to enhance the capability to shape the surface at a finer spatial scale than that of the particle jet or wire. It is also known that such "forging" process has additional benefits in some materials and application such as increase the material strength (typically referred to as laser peening) or generate surfaces that are more resistant to oxidation and other types of degradation. Furthermore, it can be applied to produce localized tailored stresses to meet specific requirements of the fabricated part. The as forming part can be kept at an elevated temperature during the manufacturing process to maintain a small temperature difference between the melt pool and the surrounding material. The temperature can be reduced to ambient at the end of the manufacturing process. This will facilitate minimizing the residual stress of manufacture material and/or address other potential temperature related material quality issues.

Reference Numeral 424—Additive Manufacturing Build Area

The build rate of the system 400 depends on the amount of material fused to the substrate per unit time. This build rate can be increased or can also be decreased depending on various designing parameters such as the desired spatial resolution (which can be adjusted to vary during manufacturing). Using a MT wire as the raw material form, the build rate can be significantly higher.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An additive manufacturing method using a substrate, comprising the steps of:
providing a linear additive manufacturing material supply by providing a stream of powder particles using a device that contains a first element that controls the flow rate of the stream of powder particles and a second element that controls the cross sectional area of the stream of powder particles;
using gravity to control the motion of the particles producing a linear stream of powder particles directed linearly straight downward by said gravity, wherein said linear stream of powder particles has a first side and a second side wherein said second side is diametrically opposite said first side;
directing a first ablation energetic beam from a first ablation energetic source to the first side of the linear stream of powder particles, and directing a second ablation energetic beam from a second ablation energetic source to the diametrically opposite second side of the linear stream of powder particles, so that the first and second ablation energetic beams remove oxidation and contamination from said linear additive manufacturing material supply;
directing one laser melting beam onto said first side of said linear stream of powder particles above laser substrate melting beam and directing another laser melting beam onto said second side of said linear stream of powder particles that is diametrically opposite said first side of said linear stream of powder particles melting said linear stream of powder particles above laser substrate melting beam forming a melted linear stream of powder; and
directing a laser substrate melting beam and said melted linear stream of powder particles to the substrate to produce the part.

2. An additive manufacturing method, comprising the steps of:
providing a linear additive manufacturing material supply by providing a stream of powder particles using a device that contains a first element that controls the flow rate of the stream of powder particles and a second element that controls the cross sectional area of the stream of powder particles;
using gravity to control the motion of the particles producing a linear stream of powder particles that is directed linearly straight downward by said gravity and to a substrate, wherein said linear stream of powder particles has a first side and a second side, and wherein said second side is diametrically opposite said first side;
directing multiple diametrically opposite laser beams, including directing one laser beam onto said first side of said linear stream of powder particles and directing another laser melting beam onto said diametrically opposite second side of said linear stream of powder particles melting said linear stream of powder particles forming a melted linear stream of powder particles;
providing a substrate melting energetic beam and a substrate melting energetic beam source that produces said substrate melting energetic beam, wherein said substrate melting energetic beam is directed to said substrate, wherein said substrate melting energetic beam is located below said one laser beam and said another laser beam; and
directing said melted linear stream of powder particles to said substrate to produce the part.

3. An additive manufacturing method, comprising the steps of:
providing a linear additive manufacturing material supply by providing a stream of powder particles using a device that contains a first element that controls the flow rate of the stream of powder particles and a second element that controls the cross sectional area of the stream of powder particles;
using gravity to control the motion of the particles producing a linear stream of powder particles directed linearly straight downward by said gravity and to a substrate, wherein said linear stream of powder particles has a first side and a second side wherein said second side is diametrically opposite said first side;
directing multiple diametrically opposite laser beams, including directing a first laser beam onto said first side of said linear stream of powder particles and directing a second laser beam onto said diametrically opposite second side of said linear stream of powder particles melting said linear stream of powder particles forming a melted linear stream of powder particles;
providing a forging energetic beam and a forging energetic beam source that produces said forging energetic beam, wherein said forging energetic beam is directed to said substrate below said melted linear stream of powder particles; and
directing said melted linear stream of powder particles to said substrate to produce the part.

* * * * *